United States Patent
Juranitch et al.

(10) Patent No.: US 7,275,295 B2
(45) Date of Patent: Oct. 2, 2007

(54) TRUE VEHICLE RUNNING CENTER SHAFT ASSEMBLY SYSTEM

(75) Inventors: James C. Juranitch, Walled Lake, MI (US); Robert D. Olschefski, New Hudson, MI (US)

(73) Assignee: Veri-Tek International Corporation, Wixom, MI (US)

( * ) Notice: Subject to any disclaimer, the term of this patent is extended or adjusted under 35 U.S.C. 154(b) by 174 days.

(21) Appl. No.: 10/487,290

(22) PCT Filed: Aug. 20, 2002

(86) PCT No.: PCT/US02/26984

§ 371 (c)(1), (2), (4) Date: Feb. 20, 2004

(87) PCT Pub. No.: WO03/072965

PCT Pub. Date: Sep. 4, 2003

(65) Prior Publication Data

US 2004/0231121 A1 Nov. 25, 2004

Related U.S. Application Data

(60) Provisional application No. 60/313,741, filed on Aug. 20, 2001, provisional application No. 60/313,739, filed on Aug. 20, 2001, provisional application No. 60/313,734, filed on Aug. 20, 2001.

(51) Int. Cl.
*G01M 19/00* (2006.01)
*F16C 3/00* (2006.01)

(52) U.S. Cl. .............. 29/407.1; 29/407.09; 29/505; 29/511; 29/521

(58) Field of Classification Search .......... 29/505, 29/509, 510, 511, 515, 520, 521, 898.07, 29/901, 407.09, 407.1; 464/134, 180, 182, 464/185; 72/67, 199, 214; 73/462; 33/412
See application file for complete search history.

(56) References Cited

U.S. PATENT DOCUMENTS 3,253,444 A * 5/1966 Dolan et al. ............... 72/107
3,525,158 A * 8/1970 Torlay ....................... 33/661
3,612,582 A * 10/1971 Pitner ...................... 403/290

(Continued)

FOREIGN PATENT DOCUMENTS

JP          63200932 A  *  8/1988

(Continued)

*Primary Examiner*—Essama Omgba
(74) *Attorney, Agent, or Firm*—Rohm & Monsanto, P.L.C.

(57) ABSTRACT

A system for assembling a vehicle drive shaft is provided with the steps of installing yokes on respective ends of a drive shaft tube, each yoke having first and second bores therethrough for receiving respective distal ends of respective spider arrangements, and rolling the outer edges of the bores using carbide rollers to urge a portion of the material of the yoke to overlie radially the respectively associated distal end of the spider arrangement. Datums are defined on the yokes and the shaft tube for determining a spatial relationship between the yokes and shaft tube. The rolling of the bore of the yoke is performed while the spider, the bearing caps, and the retention elements are maintained in preload to achieve zero tolerance. Prior to roller forming the outer edge of the bore, the spider arrangement is supported on the true rotating center of the drive shaft tube.

22 Claims, 14 Drawing Sheets

U.S. PATENT DOCUMENTS

| | | | | |
|---|---|---|---|---|
| 3,660,989 | A | 5/1972 | Pitner | 64/17 |
| 3,701,189 | A | 10/1972 | Kadono et al. | 29/148.4 |
| 3,764,647 | A * | 10/1973 | McDow | 264/242 |
| 3,783,522 | A * | 1/1974 | Dodd | 33/661 |
| 4,000,628 | A | 1/1977 | Funatani et al. | 64/17 |
| 4,148,013 | A * | 4/1979 | Finn et al. | 340/870.11 |
| 4,161,068 | A * | 7/1979 | McMaster | 33/412 |
| 4,928,401 | A * | 5/1990 | Murray, Jr. | 33/645 |
| 5,263,261 | A * | 11/1993 | Piety et al. | 33/645 |
| 5,366,316 | A * | 11/1994 | Cymbal | 403/378 |
| 5,371,953 | A * | 12/1994 | Nower et al. | 33/645 |
| 5,479,718 | A * | 1/1996 | Cook | 33/412 |
| 5,526,282 | A * | 6/1996 | Nower et al. | 700/279 |
| 5,715,609 | A * | 2/1998 | Nower | 33/645 |
| 5,797,800 | A * | 8/1998 | Rhoades et al. | 464/130 |
| 5,896,672 | A * | 4/1999 | Harris | 33/645 |
| 5,920,999 | A * | 7/1999 | Hutter | 33/645 |
| 5,930,908 | A * | 8/1999 | Patrisso et al. | 33/600 |
| 6,162,126 | A | 12/2000 | Barrett et al. | 464/134 |
| 6,336,868 | B1 * | 1/2002 | Kurecka et al. | 464/134 |
| 6,411,375 | B1 * | 6/2002 | Hinkle et al. | 356/152.1 |
| 6,574,878 | B2 * | 6/2003 | Cross | 33/142 |
| 6,804,897 | B1 * | 10/2004 | Horn | 33/606 |
| 6,923,058 | B2 * | 8/2005 | Nieman et al. | 73/462 |
| 6,972,838 | B2 * | 12/2005 | McCauley | 356/153 |
| 6,994,627 | B2 * | 2/2006 | Menosky et al. | 464/132 |
| 2001/0014624 | A1 * | 8/2001 | Edi | 464/179 |

FOREIGN PATENT DOCUMENTS

| | | | |
|---|---|---|---|
| JP | 63210419 | A * | 9/1988 |
| JP | 04269136 | A * | 9/1992 |

* cited by examiner

FIG. 13
FIG. 14
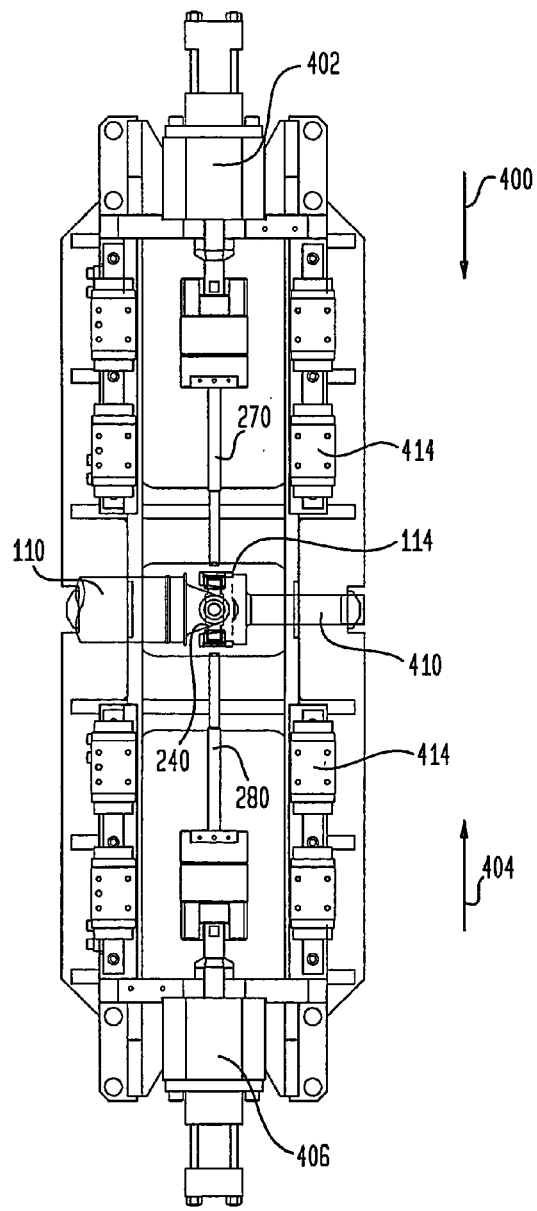
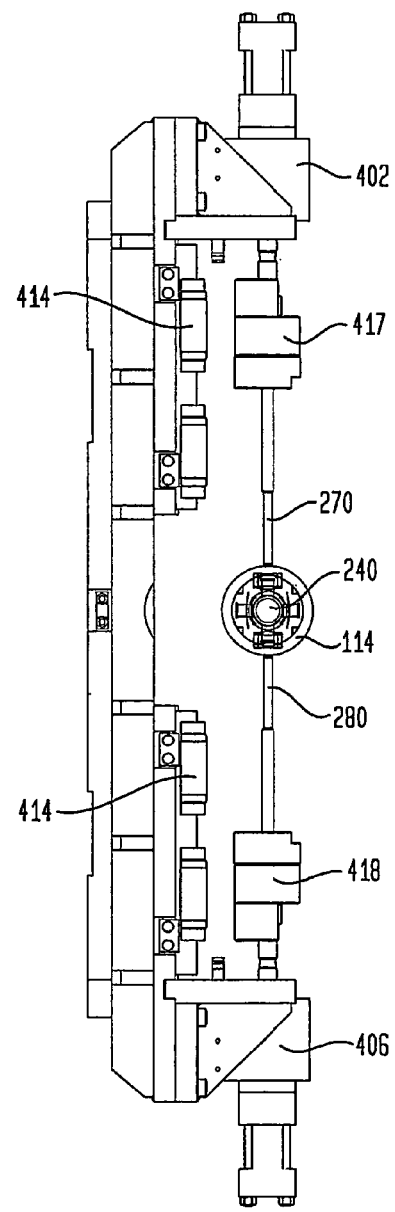

TRUE VEHICLE RUNNING CENTER SHAFT ASSEMBLY SYSTEM

RELATIONSHIP TO OTHER APPLICATION(S)

This application claims the benefit of the filing date of U.S. Provisional Patent Application Ser. Nos. 60/313,741; 60/313,734; and 60/313,739; all of which were filed on Aug. 20, 2001 in the names of the same inventors as herein.

BACKGROUND OF THE INVENTION

1. Field of the Invention

This invention relates generally to systems for assembling shafts, such as drive shafts for motor vehicles, and more particularly, to a system that facilitates assembly of shaft components at flexible couplings, such as via Cardan joints, while maintaining a true running center axis for the flexible components at both ends of the shaft.

2. Description of the Related Art

Cardan joints, also known as Hooke's joints, are well-known simple universal joints that consist of two yokes that are attached to respective shafts and connected by means of a spider. The spider is a cross-axis element that accommodates the yokes of the two respective shafts at its respective distal ends. It is evident that this simple structure can be difficult to align during assembly. This problem is compounded by the fact that the spider often is installed in a yoke with a roller bearing arrangement interposed therebetween. In addition to the tolerances that are accumulated during manufacture of the yokes and the spider, it readily can be seen that the spider is axially displaceable within each of the yokes.

It is additionally well known that the conventional Cardan joint is not a constant velocity drive element, and therefore, vibration and noise are increased if the articulation torque required to flex the joint about one axis of the spider differs greatly from the torque required to flex the joint about the other axis.

Conventional assembly processes include, for example, the fitting by hand of retained clips into grooves that are precut into the inner surface of the aperture of the yoke that accommodates the spider. As a result of typical assembly tolerances between the location of the groove, the thickness of the retaining clips, and the dimensions of the bearing cap, the known process of assembly permits the spider to move axially in each yoke during its life. The resulting instability causes imbalance and noise, vibration, and harshness ("NVH"). The prior art has endeavored to address these problems by using, for example, thermal-set glues and fillers on the drive shaft bearing retainers. This known approach is possessed of all of the problems associated with the retaining clips, and renders servicing of the joint difficult.

It is, therefore, an object of this invention to provide a system for assembling the drive shafts of motor vehicles wherein the flexible components are maintained during assembly on the true vehicle running center axis.

It is another object of this invention to provide a system for assembling drive shafts of motor vehicles wherein a consistent and uniform pre-load force is applied to the bearing ends to produce consistent articulation torque.

It is also an object of this invention to provide a system for assembling drive shafts for motor vehicles wherein the joints can easily be serviced using conventional tools and conventional retaining clips.

It is a further object of this invention to provide a system for assembling the drive shafts of motor vehicles wherein manufacturing tolerances in the axial length of the spider, the thickness of the bearing end cap, the thickness of the retaining clip, and the axial dimension of the yoke are accommodated during assembly.

SUMMARY OF THE INVENTION

The foregoing and other objects are achieved by this invention which provides, in accordance with a first aspect thereof, a system for assembling a vehicle drive shaft.

The system is provided with the steps of:
first installing a yoke on a first end of a drive shaft tube, the yoke having first and second bores therethrough for receiving respective distal ends of a spider arrangement; and
rolling an outer edge of the first bore to urge a portion of the material of the yoke to overlie radially the respectively associated distal end of the spider arrangement.

In a highly advantageous embodiment of the invention, the rolling of the outer edge of the first bore is achieved using a carbide roller arrangement.

Further in accordance with the invention, prior to performing the step of first installing a yoke, there is provided the further step of defining a datum on the yoke. The datum corresponds, in a specific illustrative embodiment of the invention, to a machined surface of the yoke, which may be a substantially cylindrical surface parallel to the axis of rotation of the yoke. There is provided the further step of defining a datum on the drive shaft tube. In a specific illustrative embodiment of the invention, the datum on the drive shaft tube corresponds to a cylindrical outer surface of the drive shaft tube. The yoke is installed on the drive shaft tube in conformance with a spatial relationship with respect to one another that is responsive to their respective datums. Such installation includes the step of supporting the yoke and the drive shaft tube, which includes the further step of clamping the drive shaft tube. Such clamping urges the drive shaft tube to a condition of increased cross-sectional roundness. In a highly advantageous embodiment of the invention, the spatial relationship is coaxial within 0.006 inches, and preferably within 0.004 inches.

In one embodiment of this system aspect of the invention, prior to performing the step of turning the outer edge of the first bore there is provided the further step of second installing a fastening ring in the first bore radially overlying of the respectively associated distal end of the spider arrangement, and the step of roller forming the outer edge of the first bore to urge the portion of the material of the yoke to overlie the fastening ring. In addition, prior to performing the step of roller forming the outer edge of the first bore there is provided the further step of third installing a bearing cap in the first bore for supporting rotatively within the first bore the respectively associated distal end of the spider arrangement.

In a further embodiment of the invention, there are provided the further steps of:
second installing a further yoke on a second end of a drive shaft tube, the further yoke having first and second bores therethrough for receiving respective second distal ends of the spider arrangement, the second distal ends being arranged orthogonal to the respective distal ends; and
roller forming an outer edge of the first bore of the further yoke to urge a portion of the material of the further yoke to overlie radially the respectively associated second distal end of the spider arrangement.

Prior to performing the step of second installing a further yoke on the second end of the drive shaft tube there are provided the further steps of defining a datum on the further yoke and a further datum on the second end of the drive shaft tube.

Prior to performing the step of roller forming the outer edge of the first bore there is provided the further step of supporting the spider arrangement in a position corresponding to the true rotating center of the drive shaft tube. The step of supporting the spider arrangement includes the further steps of:

first applying a first supporting force radially inward and coaxially parallel with the respectively associated distal end of the spider arrangement; and second applying a second supporting force radially inward and coaxially parallel with the axially opposing end of the spider arrangement, the steps of first and second applying being performed simultaneously, whereby the spider arrangement is supported to maintain its axial position.

In a still further embodiment, there is provided the step of first clamping the drive shaft tube at the first end thereof so as to be immovable with respect to the supported axial position of the spider arrangement. Simultaneously with the step of first clamping the drive shaft tube there is performed the further step of controlling the first clamping of the drive shaft tube to clamp the drive shaft tube at a predetermined transaxial location. Additionally, the drive shaft tube is further clamped at the second end thereof. Simultaneously with the further clamping of the drive shaft tube there is performed the further step of controlling the second clamping of the drive shaft tube to clamp the drive shaft tube at the predetermined transaxial location.

In accordance with an apparatus aspect of the invention there is provided a novel shaft for transmitting rotatory motion at a plurality of transmission angles. The shaft is provided with a spider arrangement having a plurality of projections, and a yoke having a transaxial bore therethrough. The transaxial bore has a circumferential outer perimeter that is roller formed radially inward to limit the extent to which a projection of the spider arrangement will penetrate radially outward through the transaxial bore.

In one embodiment of this apparatus aspect of the invention, the spider arrangement has two distal projections coaxially arranged with respect to each other, and the yoke has a further transaxial bore, the transaxial bore and the further transaxial bore being coaxial with respect to each other and accommodating therein respectively associated ones of the coaxially arranged distal projections of the spider arrangement, the further transaxial bore having a radially outer perimeter thereof roller formed radially inward to limit the extent to which the associated projection of the spider arrangement will penetrate radially outward through the further transaxial bore. The radially inwardly roller formed outer perimeters of the transaxial bore and the further transaxial bore eliminate transaxial translation of the spider arrangement, that is, the radially inwardly turned outer perimeters of the transaxial bore and the further transaxial bore are configured to achieve a zero tolerance condition to eliminate transaxial translation of the spider. In addition, the spider arrangement is transaxially disposed at the true running center of the yoke. Such a zero tolerance condition accommodates variations in the overall trunion width, the centerline to trunion end dimension of the spider, the thickness of the end of the bearing cup, the snap ring thickness, the groove thicknesses in the yoke bores, the groove to centerline dimension, the outside groove-to-groove dimension, etc. In addition, there may be provided a thrust bearing that is compressed to achieve a desired preload that maintains an acceptable articulation torque.

In a further embodiment, there is further provided a bearing cap installed on a projection of the spider arrangement. The bearing cap is accommodated within the transaxial bore of the yoke. A snap ring is, in certain embodiments, installed on within the transaxial bore of the yoke. The roller formed radially outer perimeter is arranged to overlie a circumferential portion of the snap ring. In a highly advantageous embodiment, the roller formed radially outer perimeter being is to exclude a region corresponding to the diameter of a projection of the spider arrangement.

In a specific illustrative embodiment of the invention, the step of installing the yoke on the first end of the shaft tube includes the further steps of:

defining a shaft datum on the shaft tube;

defining a yoke datum on the yoke; and installing the yoke on the first end of the shaft tube in a spatial relation responsive to the shaft datum and the yoke datum.

The step of first rolling includes, in certain embodiments, the further step of initial first rolling wherein a rolling tool arrangement is permitted to float to center itself on the first bore. There are further provided the steps of:

locking the rolling tool arrangement to prevent the rolling tool arrangement from floating; and final first rolling wherein the rolling tool arrangement urges the portion of the material of the yoke to overlie axially the respectively associated distal end of the spider arrangement.

A step of terminating the step of final first rolling is performed in response to a measured distance of axial travel of the rolling tool arrangement. In other embodiments, rolling is terminated in response to a rate of change of a measured distance of axial travel of the rolling tool arrangement. The rate of change of a measured distance of axial travel of the rolling tool arrangement may, in certain embodiments, be determined with respect to an applied axial force. In other embodiments, it may be measured with respect to time. In a still further embodiment, the termination of the step of final first rolling is responsive to the passage of a predetermined period of time, which may be obtained from a stored table. The specific determined time may be responsive to the characteristics of the material being rolled.

In a highly advantageous embodiment, the rolling tool arrangement is formed at least in part of carbide rollers that engage the material to be rolled.

In a specific illustrative embodiment of the invention, the turned radially outer perimeter is arranged to exclude a region corresponding to the diameter of a projection of the spider arrangement. The shaft has a shaft datum surface defined by its exterior surface, and the yoke has a yoke datum surface defined by a machined annular surface, the shaft datum and the yoke datum being arranged in determined spatial relation with respect to each other, preferably coaxially.

In accordance with a still further aspect of the invention wherein a novel rotatable shaft product is formed by a novel process, there are provided in the process the steps of:

(a) first installing a yoke on a first end of a shaft tube, the yoke having first and second bores therethrough for receiving respective distal ends of a spider arrangement;

(b) fixing the spider arrangement in a determined fixed spatial relationship with respect to the yoke; and (c) first roller forming an outer edge of the first bore to urge a portion of the material of the yoke to overlie radially the respectively associated distal end of the spider arrangement.

In one embodiment of this product by process aspect of the invention, the step of (b) fixing the spider arrangement includes the further step of engaging axially counteracting supports into communication with the bearing cups on the spider arrangement. The step of engaging axially counteracting supports includes, in certain embodiments, the further step of synchronizing the axially counteracting supports whereby the spider arrangement is fixed in a determined spatial relationship with respect to the yoke. The step of engaging axially counteracting supports is performed, in a highly advantageous embodiment of the invention, during the step of first rolling to ensure a zero axial tolerance condition between the spider arrangement and the first and second bores of the yoke In accordance with a further embodiment of the invention, prior to performing the step of first roller forming an outer edge, there is provided the further step of second installing a fastening ring in the first bore radially overlying of the respectively associated distal end of the spider arrangement, and the step of roller forming the outer edge of the first bore to urge the portion of the material of the yoke to overlie the fastening ring.

Prior to performing the step of roller forming an outer edge of the first bore, there is provided the further step of third installing a bearing cap in the first bore for supporting rotatively within the first bore the respectively associated distal end of the spider arrangement. In addition, in a yet further embodiment, there are provided in the inventive process the further steps of:

repeating step for the second bore; and second roller forming an outer edge of the second bore to urge a portion of the material of the yoke to overlie radially the respectively associated distal end of the spider arrangement.

Prior to performing the step of second roller forming an outer edge of the second bore, there is provided the further step of third installing a further bearing cap in the second bore for supporting rotatively within the second bore the respectively associated distal end of the spider arrangement.

BRIEF DESCRIPTION OF THE DRAWING

Comprehension of the invention is facilitated by reading the following detailed description, in conjunction with the annexed drawing, in which:

FIG. 13 is a simplified schematic front plan representation of a synchronization and centering arrangement illustrating the rods that retain the spider arrangement in fixed relation to the vehicle drive shaft clamping arrangement (not shown in this figure);

FIG. 14 is a simplified schematic side plan representation of the arrangement of FIG. 13.

DETAILED DESCRIPTION

Figure 1:
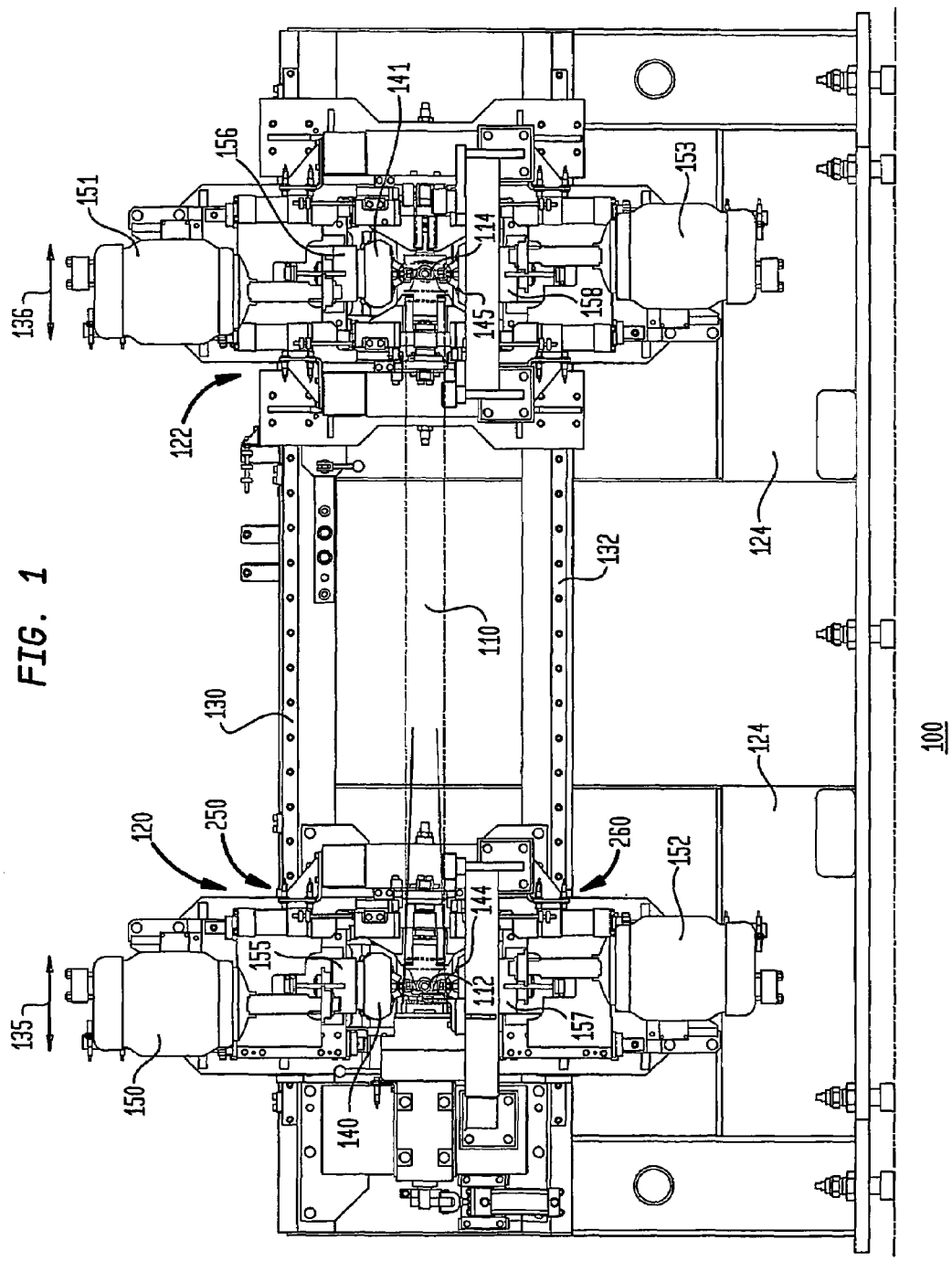
FIG. 1 is a simplified schematic front plan representation of an arrangement constructed in accordance with the principles of the invention for producing a novel vehicle drive shaft.

FIG. 1 is a simplified schematic front plan representation of a spider installation arrangement 100 constructed in accordance with the principles of the invention for producing a novel vehicle drive shaft 110 having a first Cardan joint 112 coupled to a first end of vehicle drive shaft 110, and a second Cardan joint 114 coupled to a second end of vehicle drive shaft 110. Spider installation arrangement 100 is formed generally of a first tooling assembly 120, a second tooling assembly 122, and a base 124, base 124 having an upper rail arrangement 130 and a lower rail arrangement 132. The upper and lower rail arrangements are adapted to permit the first and second tooling assemblies to be translatable laterally in the directions of dual-headed arrows 135 and 136, respectively, and thereby accommodate vehicle drive shafts of difference lengths.

First tooling assembly 120 and second tooling assembly 122 are each provided with a respective associated one of first upper rotating die 140 and second upper rotating die 141. In addition, the first and second tooling assemblies are each provided with a respective associated one of a first lower rotating die 144 and a second lower rotating die 145. As will be described in greater detail hereinbelow, the first upper and lower rotating dies, which are installed on first tooling assembly 120, serve to install the first Cardan joint spider (not specifically identified in this figure) in first Cardan joint 112, and similarly, the second upper and lower rotating dies, which are installed on second tooling assembly 122, serve to install the second Cardan joint spider (not specifically identified in this figure) in second Cardan joint 114. During installation of the first and second spiders in this specific illustrative embodiment of the invention, the Cardan joints and vehicle drive shaft 110 are maintained in a predetermined coaxial relationship that corresponds to the true vehicle running center ("TVRC"). In the present embodiment, the TVRC is coaxial with the longitudinal axis (not shown) of vehicle drive shaft 110. Such centering of the vehicle drive shaft and the first and second Cardan joints reduces imbalance and NVH, as previously noted, during operation of the vehicle (not shown) in which the vehicle drive shaft of the present invention is installed.

Each of first upper and first lower rotating dies 140 and 144, and second upper and second lower rotating dies 141 and 145 have a respective associated source of rotatory energy in the form of electric motors 150-153. Each such electric motor has coupled thereto an associated one of reduction gear assemblies 155-158.

In FIG. 1, the drive shaft is fully assembled with the flange yoke on the left side, the spline yoke on the right side and all spiders, bearings and snap rings. The bearings and snap rings are not installed to their full depth in any of the yokes, because they will be centered and preloaded as part of the operation of this machine prior to roll forming, as will be discussed in detail below. In operation, the drive shaft is manually loaded to the "load assist" supports, then the operator positions the flange yoke to the left hand clamp fixture and manually actuates the clamp lever. The operator then positions the rest of the drive shaft in line with the tube clamp jaws, which then hydraulically advance, clamping and centralizing the tube to the flange yoke. At the same time, the spline clamp jaws hydraulically advance clamping and centralizing the spline yoke to the tube. Assembly is accomplished in only one plane (one set of spider bearings perjoint) at a time, then the bearings are compressed to the spider centralizing the yoke to the tube and setting a bearing preload. After roll forming the bearing retainer edge, the shaft is automatically unclamped, rotated 90 degrees (by actuator 420 in FIG. 15) and the procedure is then repeated on the second set of bearings of that joint. Two or more joints can be centralized, preloaded, and rolled at a time.

Figure 2:
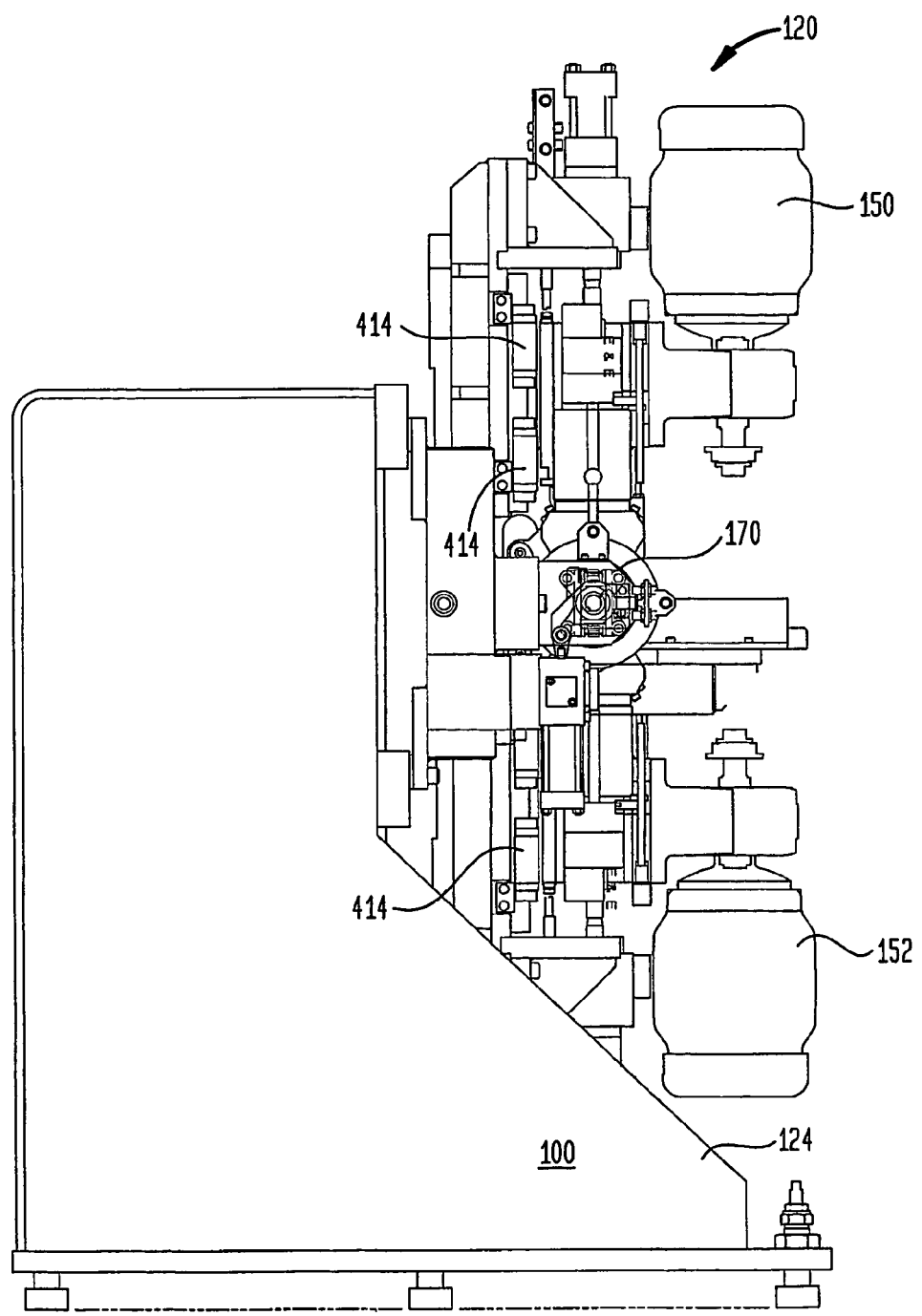
FIG. 2 is a simplified schematic side plan representation of the arrangement of FIG. 1.

FIG. 2 is a simplified schematic side plan representation of spider installation arrangement 100 of FIG. 1. Elements of structure that previously have been discussed are similarly designated. In FIG. 2, first tooling assembly 120 is shown without first upper rotating die 140 or first lower rotating die 144. First Cardan joint 112 is presented in an end view in this figure, thereby showing a four-holed mounting flange 170 of first Cardan joint 112. More specifically, four-holed mounting flange 170 is coupled to vehicle drive shaft 110 via the Cardan joint spider (not shown in this figure). In use in a vehicle (not shown), four-holed mounting flange 170 will be coupled to the pinion gear (not shown) of the differential gear assembly (not shown) of the vehicle. The other end of vehicle drive shaft 110 (not shown in this figure) will engage the output spline shaft (not shown) of the vehicle's transmission (not shown).

Figure 3:
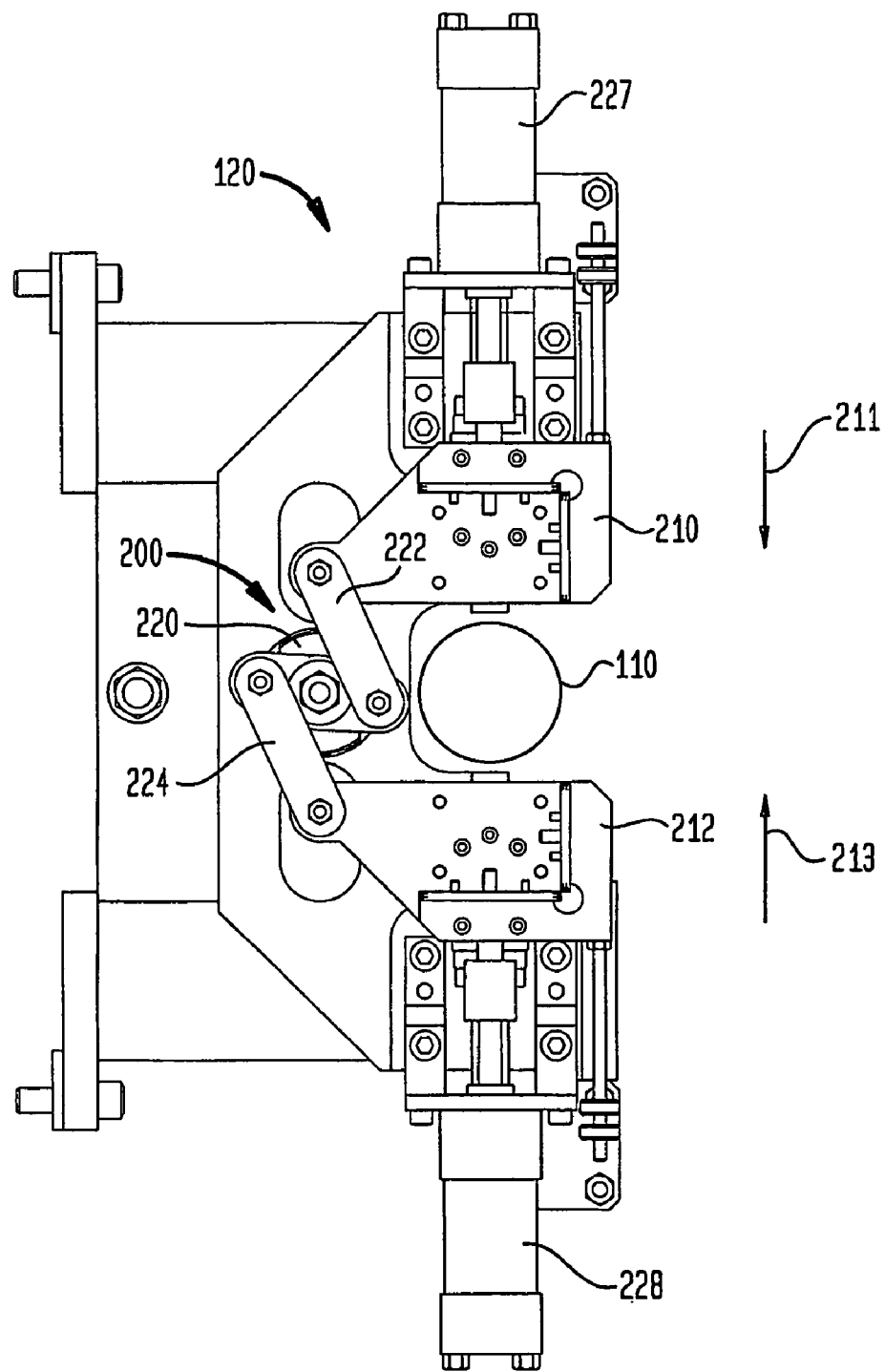
FIG. 3 is a simplified schematic side plan representation of the arrangement of FIG. 1 illustrating a synchronization and centering arrangement for ensuring that the vehicle drive shaft is clamped at a determined axial location.

FIG. 3 is a simplified schematic side plan representation of spider installation arrangement 100 of FIG. 1 illustrating a synchronization and centering arrangement 200 of first tooling assembly 120 for ensuring that vehicle drive shaft 110 is clamped at a determined axial location that corresponds to the TVRC. A similar synchronization and centering arrangement is provided in this specific illustrative embodiment of the invention for second tooling assembly 122 (not shown in this figure). Elements of structure that previously have been discussed are similarly designated. As shown in FIG. 3, clamping of vehicle drive shaft 110 is effected by translating vertically an upper clamp jaw 210 in the direction of arrow 211, and simultaneously translating vertically lower clamp jaw 212 in the direction of arrow 213. Upper clamp jaw 210 and lower clamp jaw 212 are each provided with a clamping gripper (not shown in this figure) that communicates with vehicle drive shaft 110 and exerts the clamping force thereto. See, for example, upper and lower clamping grippers 230 and 232 in FIG. 4.

Referring again to FIG. 3, it is important that vehicle drive shaft 110 be clamped and retained in a predetermined axial location, and precision in such axial positioning cannot be achieved unless the upper and lower clamp jaws are controlled in their respective vertical translation. Control is achieved, as previously noted, by operation of synchronization and centering arrangement 200 which is in the form of a rotatory synchronization element 220 that is coupled by a link 222 to upper clamp jaw 210 and by a further link 224 to lower clamp jaw 212.

The translation of upper clamp jaw 210 in the direction of arrow 211 (and opposite thereto during unclamping) is achieved in this specific illustrative embodiment of the invention by operation of an hydraulic actuator 227. Similarly, the translation of lower clamp jaw 212 in the direction of arrow 213 (and opposite thereto during unclamping) is achieved in this specific illustrative embodiment of the invention by operation of an hydraulic actuator 228. Both clamp jaws will travel in this specific illustrative embodiment of the invention for identical distances (in opposite directions) at equal rates of speed by operation of synchronization and centering arrangement 200. It is to be understood, however, that persons of skill in the art can configure different forms of synchronization and centering arrangements to achieve other or unequal rates, or asymmetrical amounts, of displacement of the clamp jaws for other specific applications or embodiments.

Figure 4:
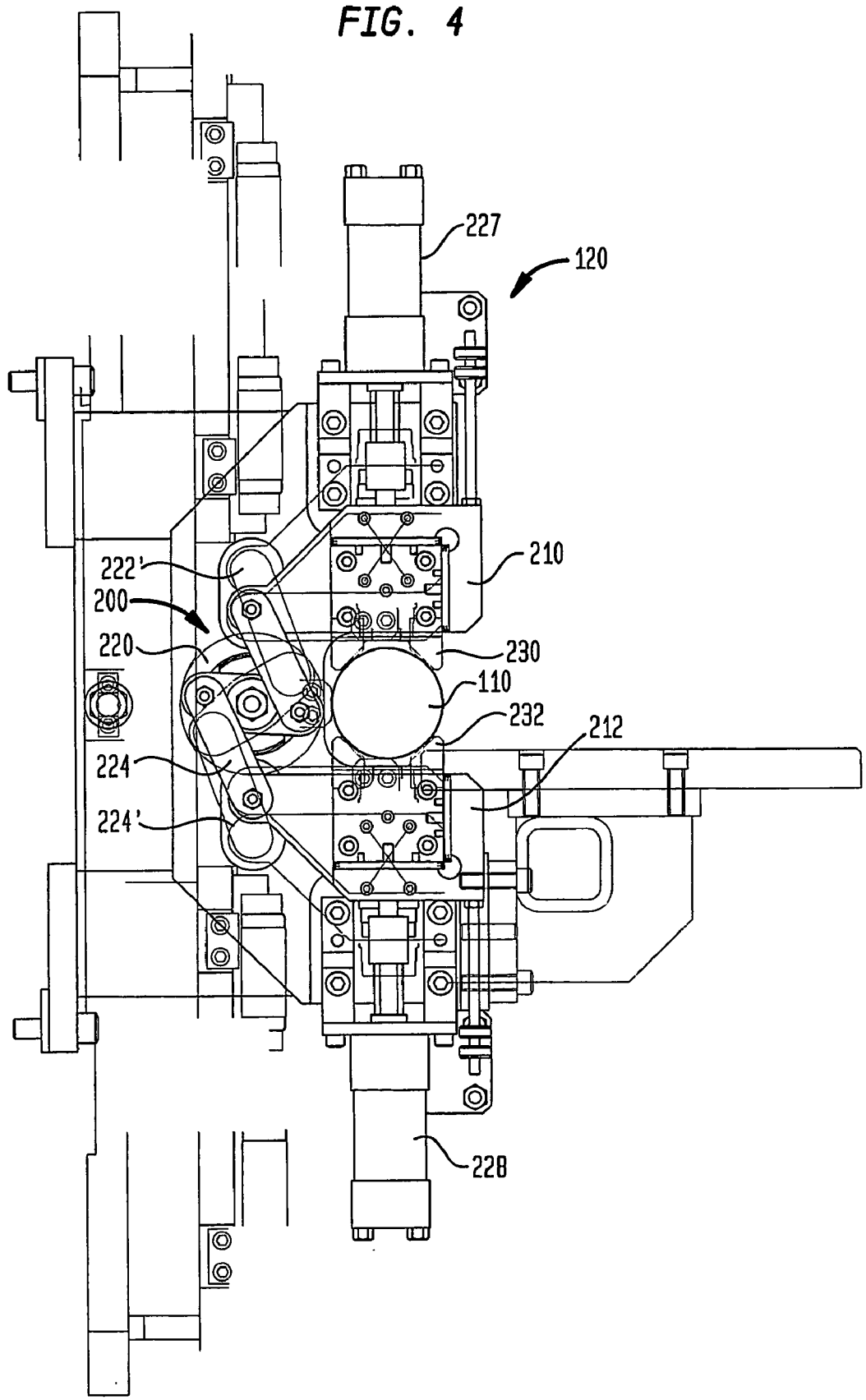
FIG. 4 is the simplified schematic side plan representation of FIG. 3 illustrating additional components and details, and further illustrating transaxial displacement of the vehicle drive shaft clamping assembly to illustrate clamping and release of the vehicle drive shaft.

FIG. 4 is the simplified schematic side plan representation of spider installation arrangement 100 of FIG. 3 illustrating synchronization and centering arrangement 200 of first tooling assembly 120 in plural positions for ensuring that vehicle drive shaft 110 is clamped at a determined axial location that corresponds to the TVRC. Elements of structure that previously have been discussed are similarly designated, and there is also shown in this figure additional elements of structure (not specifically designated). This figure illustrates rotatory synchronization element 220 rotated counter-clockwise whereby link 222 is displaced upward to the position of link 222' and link 224 is displaced downward to the position of link 224'. In this figure, vehicle drive shaft 110 is in communication with upper clamping gripper 230 and lower clamping gripper 232.

Figure 5:
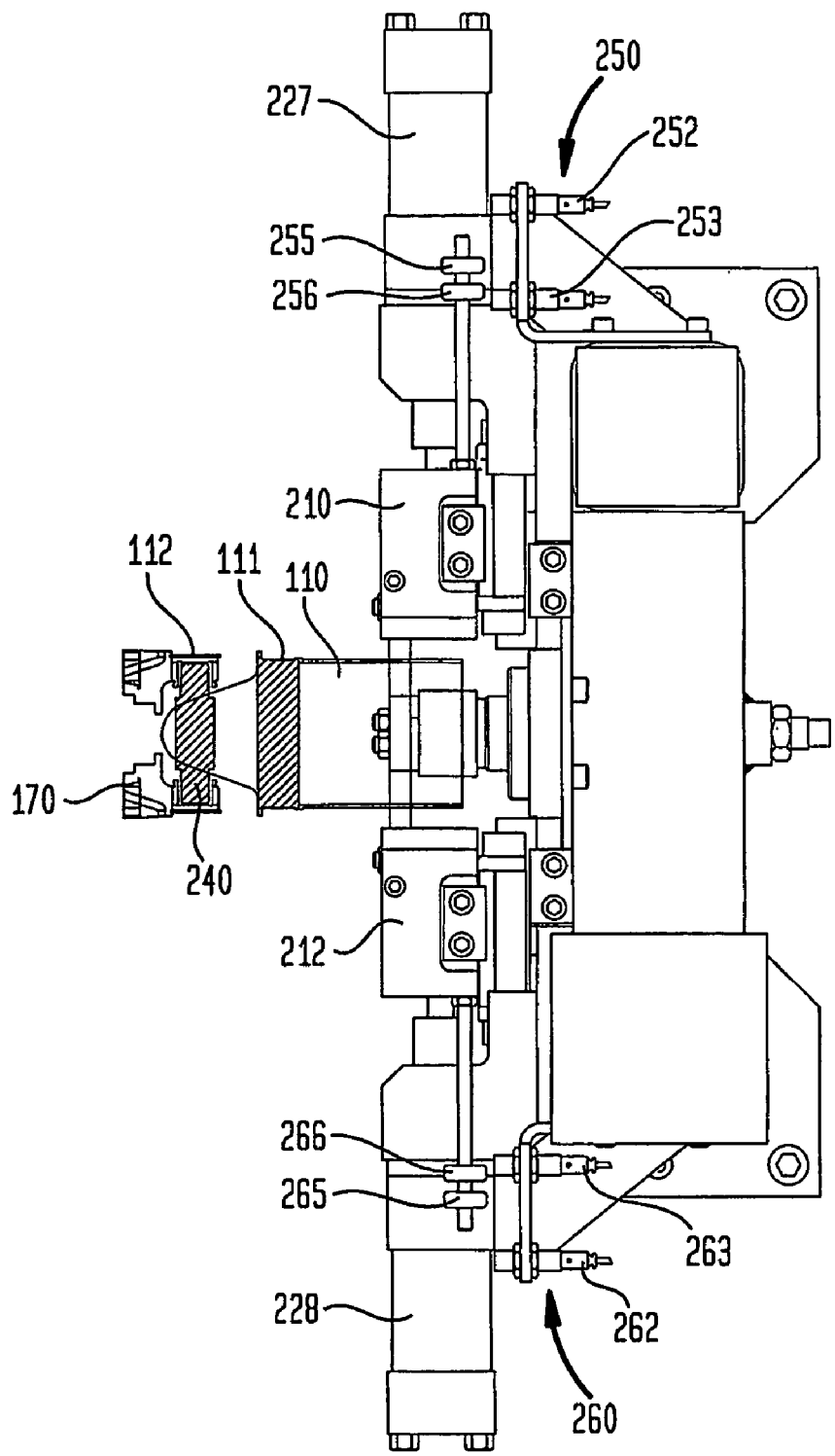
FIG. 5 is a simplified schematic front plan representation of the synchronization and centering arrangement.

FIG. 5 is a simplified schematic front plan representation of first tooling assembly 120 showing in greater detail the first end of vehicle drive shaft 110 and first Cardan joint 112 installed thereon. A spider 240 of first Cardan joint 112 is shown cross-sectionally and coupled to four-holed mounting flange 170 (also shown in cross-section). In this specific illustrative embodiment of the invention, a shaft datum for vehicle drive shaft 110 is defined on the outer surface thereof. Similarly, a yoke datum is defined on a machined surface 111 of the yoke. As shown, the vehicle drive shaft and the yoke are arranged in relation to one another in accordance with the respective datums.

Although some elements of structure have been removed from the depiction of first tooling assembly 120 in FIG. 5 for the sake of improving clarity and comprehension of the invention, other structural elements that were not viewable in FIG. 4 are shown in FIG. 5. For example, it is seen in FIG.

5 that the extent of vertical translation of upper clamp jaw 210 is detected by a sensor assembly 250 having sensors 252 and 253 that detect the proximity of detectable elements 255 and 256. Similarly, the extent of vertical translation of lower clamp jaw 212 is detected by a sensor assembly 260 having sensors 262 and 263 that detect the proximity of detectable elements 265 and 266.

Figure 6:
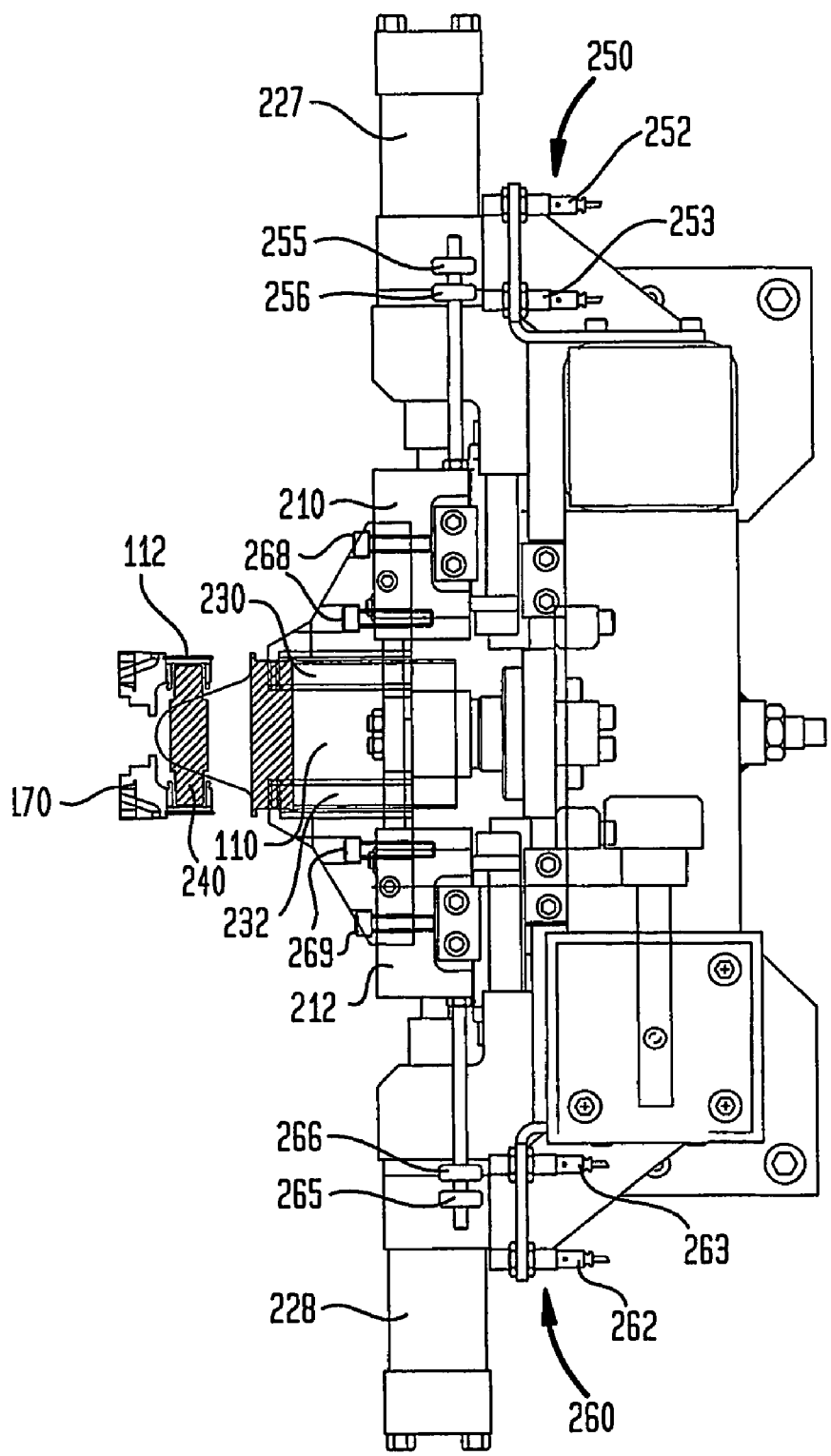
FIG. 6 is the simplified schematic front plan representation of the synchronization and centering arrangement of FIG. 5, illustrating additional components and details.

FIG. 6 is the simplified schematic front plan representation of the synchronization and centering arrangement of FIG. 5, illustrating additional components and details. Elements of structure that previously have been discussed are similarly designated. As shown in FIG. 6, clamping gripper 230 and lower clamping gripper 232 are shown to be in gripping communication with vehicle drive shaft 110. There is additionally shown in this figure that clamping gripper 230 is affixed to upper clamp jaw 210 by a plurality of threaded fasteners 268, and lower clamp jaw 212 is similarly affixed to lower clamp jaw 212 by a second plurality of threaded fasteners 269.

Figure 7:
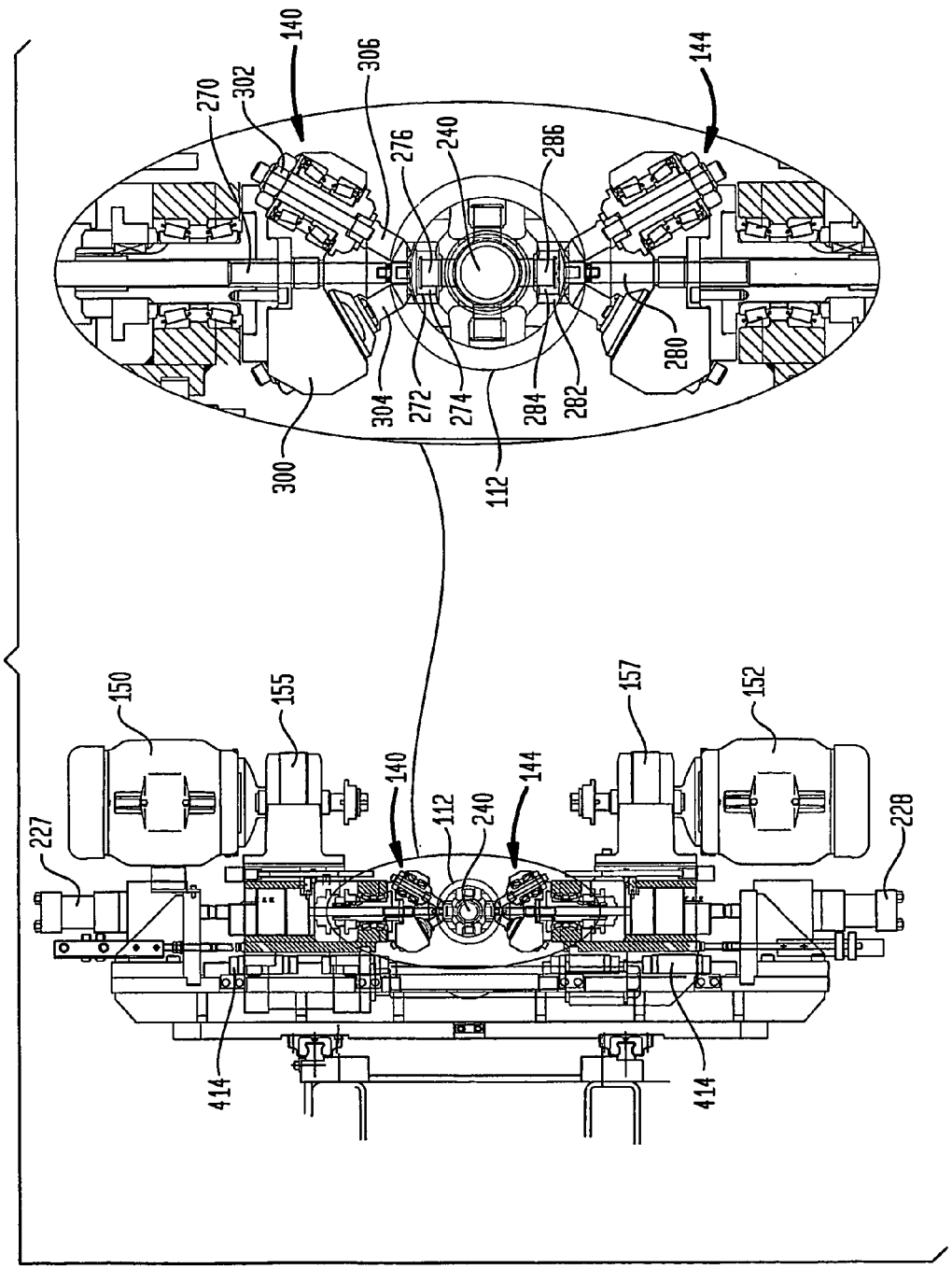
FIG. 7 is the simplified schematic side plan representation as in FIG. 3, but further showing the rotary tooling that roll forms the perimeter of outer edge of the bores of a yoke, and further illustrating a more detailed view of the radiative tooling in engagement with the yoke of a Cardan joint.

FIG. 7 is the simplified schematic side plan representation as in FIG. 3, and further shows details of first upper rotating die 140 and first lower rotating die 144, the coverings thereof having been removed, and further illustrate a more detailed view of the rotating die in engagement with the yoke of first Cardan joint 112. As will be described herein, the rotating dies roll form the perimeter of outer edge of the radially distal bores of a yoke of first Cardan joint 112 to secure therewith in spider 240. In the specific illustrative embodiment of the invention, the rotating dies are operated at approximately 30 rpm. Elements of structure that previously have been discussed are similarly designated.

Referring to first upper rotating die 140 in FIG. 7, there is first provided an upper centering rod 270 that is accommodated within a through bore 272 so as to apply a downward force on a bearing cap 274 that is installed on upwardly extending end 276 of spider 240. The downward urge applied by upper centering rod 270 is counteracted by an upward urge applied by lower centering rod 280. Upper centering rod 270 and lower centering rod 280 are controlled to maintain spider 240 positioned, in this specific illustrative embodiment of the invention, so as to be centered with the longitudinal axis of vehicle drive shaft 110 (not shown in this figure). In a manner similar to that of upper centering rod 270, lower centering rod 280 that is accommodated within a through bore 282 so as to apply an upward force on a lower bearing cap 284 that is installed on downwardly extending end. 286 of spider 240.

While spider 240 is retained in coaxial position by operation of upper centering rod 270 and lower centering rod 280, as described immediately hereinabove, first upper rotating die 140 and first lower rotating die 144 are urged toward respective ones of upwardly extending end 276 and downwardly extending end 286 of spider 240. With reference to first upper rotating die 140, this figure shows that there is provided a first spindle 300 and a second spindle 302 that is shown partially cross-sectionally. Each of first spindle 300 and second spindle 302 is provided with a respective one of a first rolling tool 304 and second rolling tool 306. The first and second rolling tools are urged toward the upper edge of through bore 272 which, as will be described below, is rolled over a snap ring (not shown in this figure) and bearing cap 274 to prevent same from being displaced upward within through bore 272. A similar rolling of the lowermost extending edge of lower through bore 282 is achieved by first lower rotating die 144 which is urged upward as first upper rotating die 140 is urged downward. First upper rotating die 140 is rotated upon actuation of electric motor 150. First lower rotating die 144 is rotated upon actuation of electric motor 152.

Figure 8:
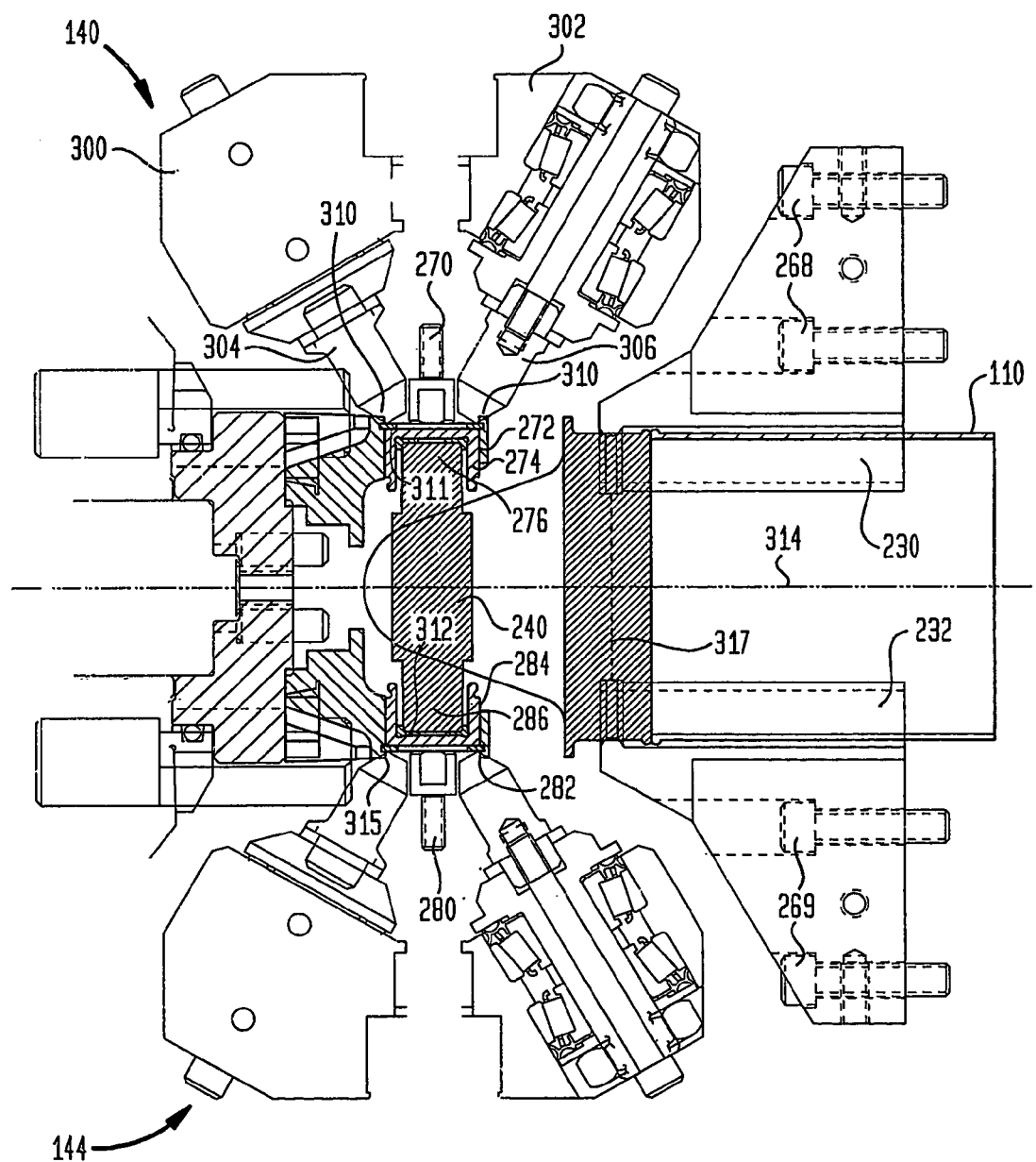
FIG. 8 is an enlarged simplified schematic representation of the radiative tooling in engagement with the yoke of a Cardan joint.

FIG. 8 is an enlarged simplified schematic partially cross-sectional front plan representation of first upper rotating die 140 and first lower rotating die 144 in engagement with the yoke of first Cardan joint 112. Elements of structure that previously have been discussed are similarly designated. As previously stated, first upper rotating die 140 is first provided an upper centering rod 270 that is accommodated within through bore 272 so as to apply a downward force on a bearing cap 274 that is installed on upwardly extending end 276 of spider 240. The downward urge applied by upper centering rod 270, as noted, is counteracted by the upward urge applied by lower centering rod 280. Upper centering rod 270 and lower centering rod 280 maintain spider 240 centered with the longitudinal axis of vehicle drive shaft 110. In a manner similar to that of upper centering rod 270, lower centering rod 280 that is accommodated within a through bore 282 so as to apply an upward force on a lower bearing cap 284 that is installed on downwardly extending end 286 of spider 240. First rolling tool 304 and second rolling tool 306 are shown to be in communication with upper edge 310 of through bore 272. In this specific illustrative embodiment of the invention, the rolling tools are formed of carbide.

As described hereinabove in relation to FIG. 7, while spider 240 is retained in coaxial position relative to vehicle drive shaft 110 by operation of upper centering rod 270 and lower centering rod 280, first upper rotating die 140 and first lower rotating die 144 are urged toward respective ones of upwardly extending end 276 and downwardly extending end 286 of spider 240. During this operation the opposite Cardan yoke (90° out of position from the yoke portions being roll formed) is held in proper position by a corresponding clamping device (not shown), notwithstanding the application of a reload transmitted by upper centering rod 270 and lower centering rod 280 via the respective bearing caps and snap rings. The first and second rolling tools are urged toward upper edge 310 of through bore 272 which is rolled over snap ring 311 and bearing cap 274, thereby blocking same from passing upward within through bore 272. In a highly advantageous embodiment of the invention, the edge roll (not shown in this figure) that is effected by the rolling tools extends radially inward so as to overlie snap ring 311, without extending radially inward over bearing cap 274. This will permit disassembly of first Cardan joint 112 in a conventional manner by removal of snap ring 311. Of course, a snap ring need not be provided in the practice of the invention, and first rolling tool 304 and second rolling tool 306 can be configured by persons of ordinary skill in the art to extend the rolled upper edge 310 of through bore 272 radially inward to overlie bearing cap 274. In addition, the present specific illustrative embodiment of the invention is shown in this figure with snap ring 311 installed in a correspondingly dimensioned snap ring groove in through bore 272. In certain embodiments of the invention, the cost associated with the formation of the snap ring groove can be eliminated by use of an enlarged outer radius for through bore 272 that would accommodated snap ring 311, the snap ring being retained by the radially inwardly rolled upper edge 310 of through bore 272, formed as described herein.

A similar rolling of the lowermost extending edge of lower through bore 282 is achieved by operation of first lower rotating die 144 which is urged upward contemporaneously with first upper rotating die 140 being urged downward. As previously noted, spider 240 is maintained in the coaxial TVRC position by operation of upper and lower centering rods 270 and 280 which are urged to apply balanced counteracting forces with respect to each another. The balanced counteracting forces retain the combination of spider 240, bearing cap 274, and lower bearing cap 284, as well as snap rings 311 and 312 in certain embodiments, on the TVRC, which in this specific illustrative embodiment of the invention, is coaxial with longitudinal axis 314 of vehicle drive shaft 110.

First upper rotating die 140 is rotated upon actuation of electric motor 150 (not shown in this figure). Similarly, first lower rotating die 144 is rotated upon actuation of electric motor 152 (not shown in this figure). Such rotation of the rotating dies causes the rolling of upper edge 310 of through bore 272 and lower edge 315 of through bore 282.

Figure 9:
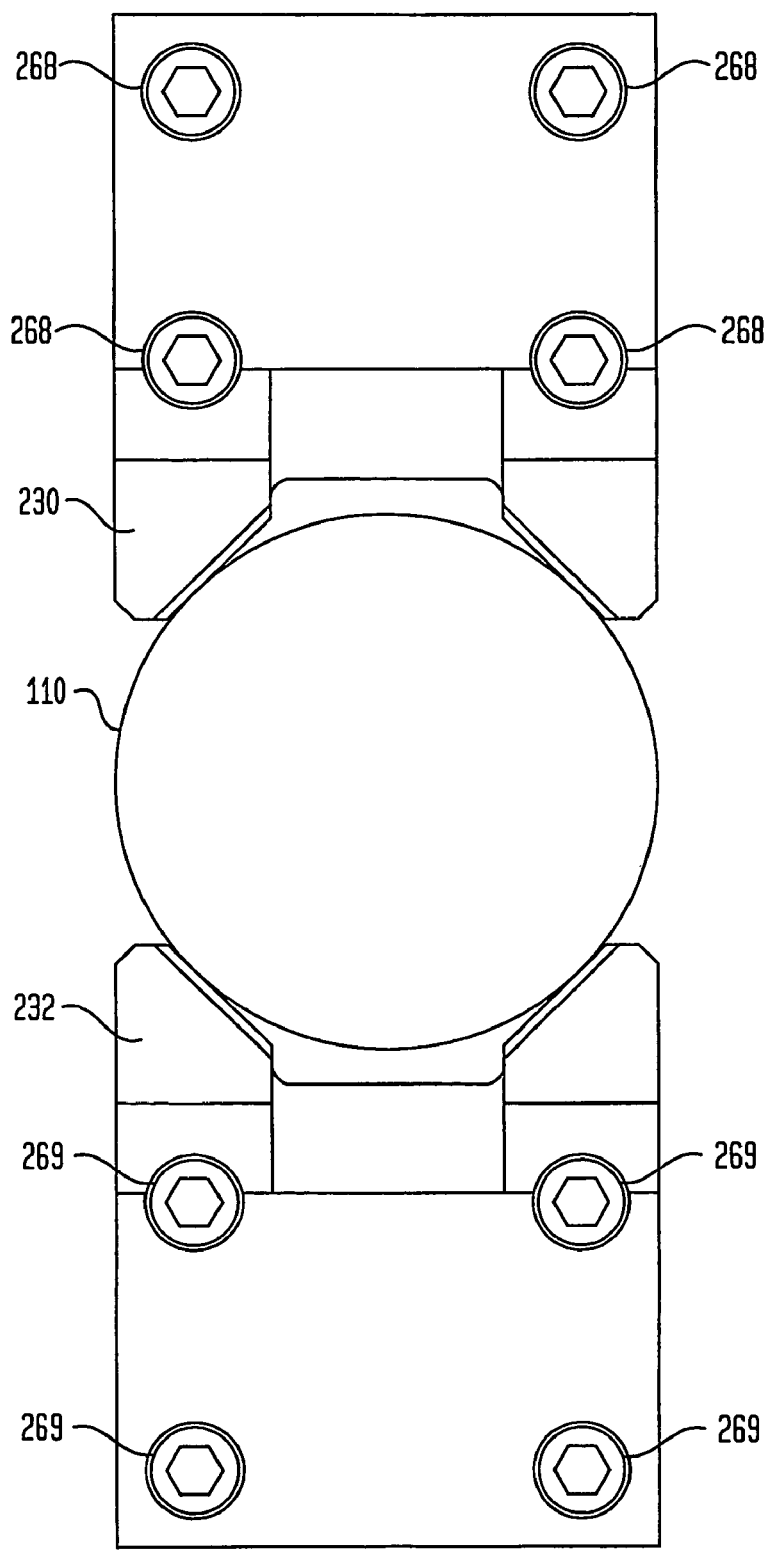
FIG. 9 is an enlarged simplified schematic representation the vehicle drive shaft being secured in place by clamps.

FIG. 8 additionally shows clamping gripper 230 and lower clamping gripper 232 in engagement with vehicle drive shaft 110. FIG. 9 is an enlarged simplified schematic representation showing vehicle drive shaft 110 (in end view) being secured in place by clamping gripper 230 and lower clamping gripper 232. As noted in connection with FIG. 6, clamping gripper 230 is coupled to upper clamp jaw 210 (not shown in this figure) by the four threaded fasteners 268 shown in FIG. 9. Similarly, lower clamping gripper 232 is coupled to lower clamp jaw 212 (not shown in this figure) by the four threaded fasteners 269 also shown in FIG. 9. As further shown in FIG. 8, clamping gripper 230 and lower clamping gripper 232 grip vehicle drive shaft 110 on its circumferential datum line 317, which is a circumferential reference line in relation to which manufacturing dimensions are established during manufacture of vehicle drive shaft 110.

In operation, the centering rods apply a bearing press force to the outside ends of the bearing cups that are vertically positioned in the machine. This force pushes the bearing cups into contact with the vertical trunnions of the spider. The horizontal trunnions of the spider are held in location by the horizontal bearings installed in the accompanying yoke bores. The horizontal yoke bores are located by the equalizing links and jaws and held central to the flange yoke mounted on the opposing clamp fixture. During the roller forming process, the force applied to the edge of the snap ring retention bore causes the yoke arms to flex. As the arm flexes toward the center of the spider it moves down on the bearing, because the bearing is solid against the spider. When the roller is rotated 90°, the yoke arm flexes upward, lifting the bearing, and therefore backing it away from the spider. This backing away of the bearings causes loss of the compression preload of the thrust bearings (located in the bearing cups) against the end of the spider trunnions. The compression force (which is selectable for different applications) will overcome the spring-back force against the bearing cups and maintain bearing thrust washer preload.

In this embodiment, each centering rod is independently actuated and force-controlled. The force is measured by a pressure transducer mounted in the hydraulic supply line to the corresponding cylinder actuator. The roller actuator slides are linked with a common hydraulic cylinder acting as an equalizing force mechanism. The force is monitored and controlled with feedback from a pressure transducer mounted in the hydraulic supply line to this cylinder.

Figure 10:
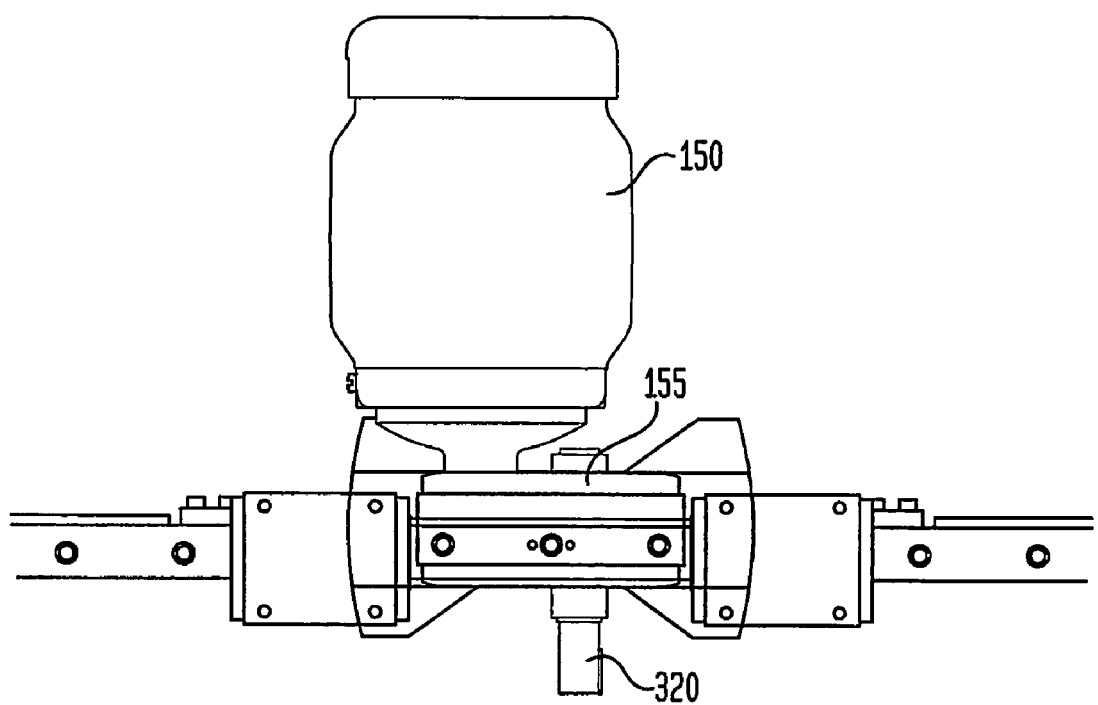
FIG. 10 is a simplified schematic representation of a motor and speed reduction gearbox for delivering rotatory energy to the radiative tooling (not shown in this figure)

FIG. 10 is a simplified schematic representation of electric motor 150 and its associated reduction gear assembly 155 for delivering rotatory energy to first upper rotating die 140 (not shown in this figure). As described in connection with FIG. 8, the rotation of the upper and lower rotating dies results in the rolling of the outer edges of the through bores thereby retaining spider 240 in coaxial alignment with the TVRC. The rotatory energy of electric motor 150 is delivered at a reduced rate of rotation at output shaft 320. The output shaft is coupled to first upper rotating die 140.

Figure 11:
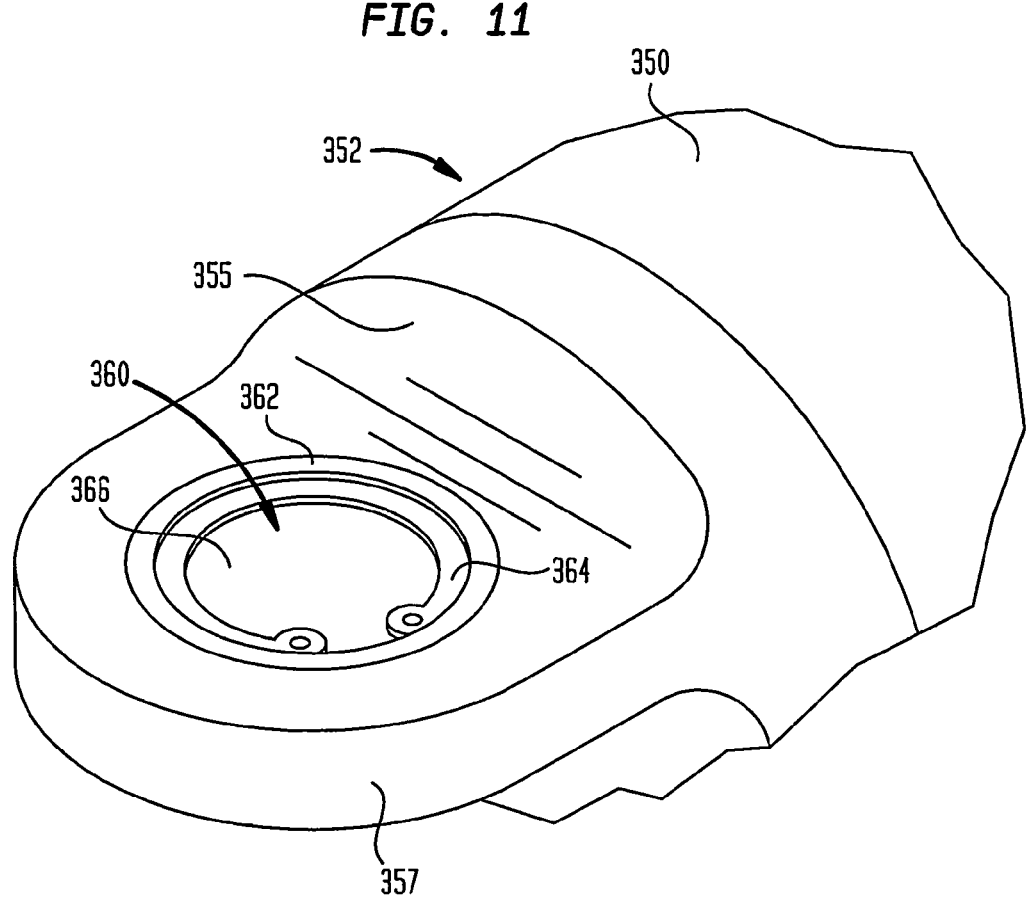
FIG. 11 is a partially fragmented simplified sketch of a novel vehicle drive shaft having a yoke of a Cardan joint embodiment of the invention that has been subjected to the inventive process.

FIG. 11 is a partially fragmented simplified sketch of a novel vehicle drive shaft 350 embodiment of the invention that has been subjected to the inventive process, having a yoke 355 of a Cardan joint (not specifically designated) attached to end 352 of vehicle drive shaft 350. Elements of structure that previously have been discussed are similarly designated. As shown in this figure, yoke 355 has an ear 357 that has a through-hole 360 having a rolled outermost edge 362 that is shown to have been rolled to overlie a snap ring 364. Snap ring 364 is shown to overlie the uppermost surface of a bearing cap 366. Thus, rolled outermost edge 362 prevents snap ring 364 from being released outward of through-hole 360, and snap ring 364 prevents bearing cap 366 from exiting through-hole 360. As previously noted, snap ring 364 may be eliminated in certain embodiments of the invention. It should be noted that variations in the thicknesses of production snap rings will not affect the coaxial alignment with the TVRC in certain embodiments of the invention where centering rods 270 and 280 (not shown in this figure) are configured to communicate directly with the bearing caps.

Figure 12:
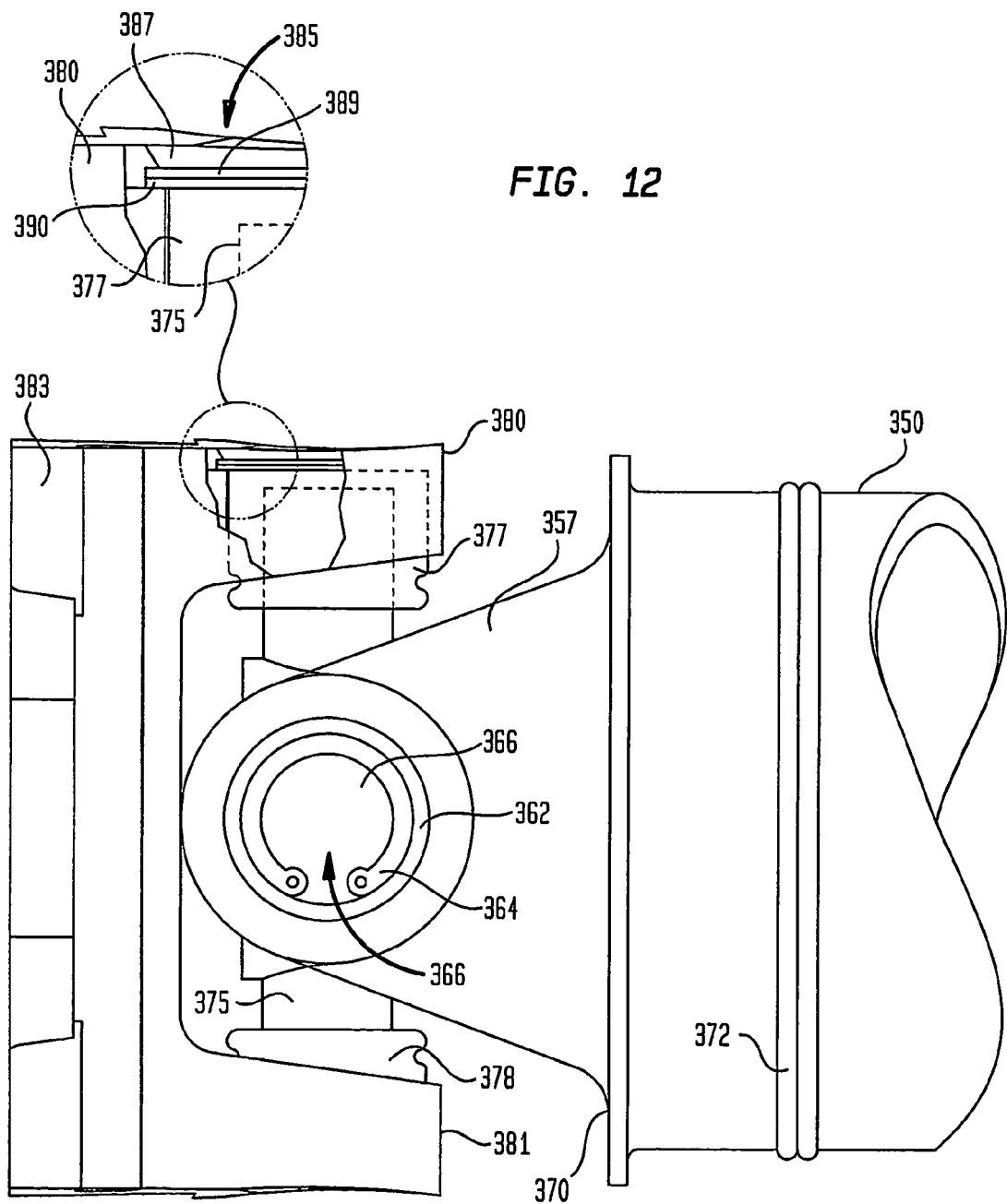
FIG. 12 is a partially fragmented simplified representation of a Cardan joint embodiment of the invention that has been subjected to the inventive process.

FIG. 12 is a partially fragmented and partially phantom simplified representation of the embodiment of FIG. 11 that has been subjected to the inventive process described herein. Elements of structure that previously have been discussed are similarly designated. As shown in this figure, vehicle drive shaft 350 is coupled to yoke 355 of Cardan joint 370 that has been coupled thereto by a weld 372. A spider 375 is shown to have installed thereon a bearing cap 377 and a further bearing cap 378, each of which is associated with a respective one of ears 380 and 381 of a four-holed mounting flange 383.

With reference to the structure of ear 380 shown in phantom representation, the details of the rolled edge structure are shown in greater detail in the magnified view. As shown therein, ear 380 has an aperture 385 therethrough, the outermost edge 387 thereof is shown to have been rolled to the form of an inverted truncated pyramid. A snap ring 389 is shown in this embodiment to have been deposited in an outer region 390 of enlarged diameter of aperture 385. The diametrical enlargement of outer region 390 is shown exaggerated and not to scale for the sake of improving comprehension of the invention. In this specific illustrative embodiment of the invention, therefore, it is noteworthy that there is not provided an internal groove for accommodating the snap ring, as is the case with the embodiment of FIG. 8, which shows, for example, snap ring 311 installed in snap ring groove 313. Thus, in the embodiment of FIG. 12, a cost saving is achieved.

Further in regard of FIG. 12, it is noted that the radially inner extent of rolled outermost edge 387 does not extend to a diameter less than that of bearing cap 377.

Accordingly, conventional disassembly of the Cardan joint is not precluded by the present inventions, since upon removal of snap ring 389 using conventional tools, bearing cap 377 will pass through the opening within rolled outermost edge 387, whereupon the Cardan joint can be entirely disassembled, or the bearing caps thereof be replaced.

FIGS. 13 and 14 are simplified schematic front and side plan representations, respectively, of a synchronization and centering arrangement for spider 240 illustrating additional elements of structure associated with upper centering rod 270 and lower centering rod 280 that retain spider 240 in fixed relation to the vehicle drive shaft clamping arrangement (not shown in this figure) and the TVRC. Elements of structure that previously have been discussed are similarly designated. In this specific illustrative embodiment of the invention, upper centering rod 270 is urged in the direction of arrow 400 by operation of an actuator 402. Similarly, lower centering rod 280 is urged in the direction of arrow 404 by operation of an actuator 406. In this embodiment of the invention, actuators 402 and 406 are hydraulic devices. Actuator 402 is coupled to upper centering rod 270 via a floating coupling 417 and actuator 406 is coupled to lower centering rod 280 via a floating coupling 418. The upper and lower centering rods apply a controlled force to bearing caps 377 and 378 (not shown in this figure, see, FIG. 12) during the roll forming process. This reload must be maintained between each set of bearings located 90° from each other to prevent drive line oscillations during rotation of the vehicle drive shaft in the vehicle.

In the representations of FIGS. 13 and 14, there is shown second Cardan joint 114 coupled to the second end of vehicle drive shaft 110. The Cardan joint couples a spline 410 that will engage the output spline shaft (not shown) of the vehicle's transmission (not shown). These figures additionally show bearings 414 that are used to support the roller heads (not shown in this figure) and associated drivers (not shown in this figure). See, for example, FIGS. 2 and 7.

Figure 15:
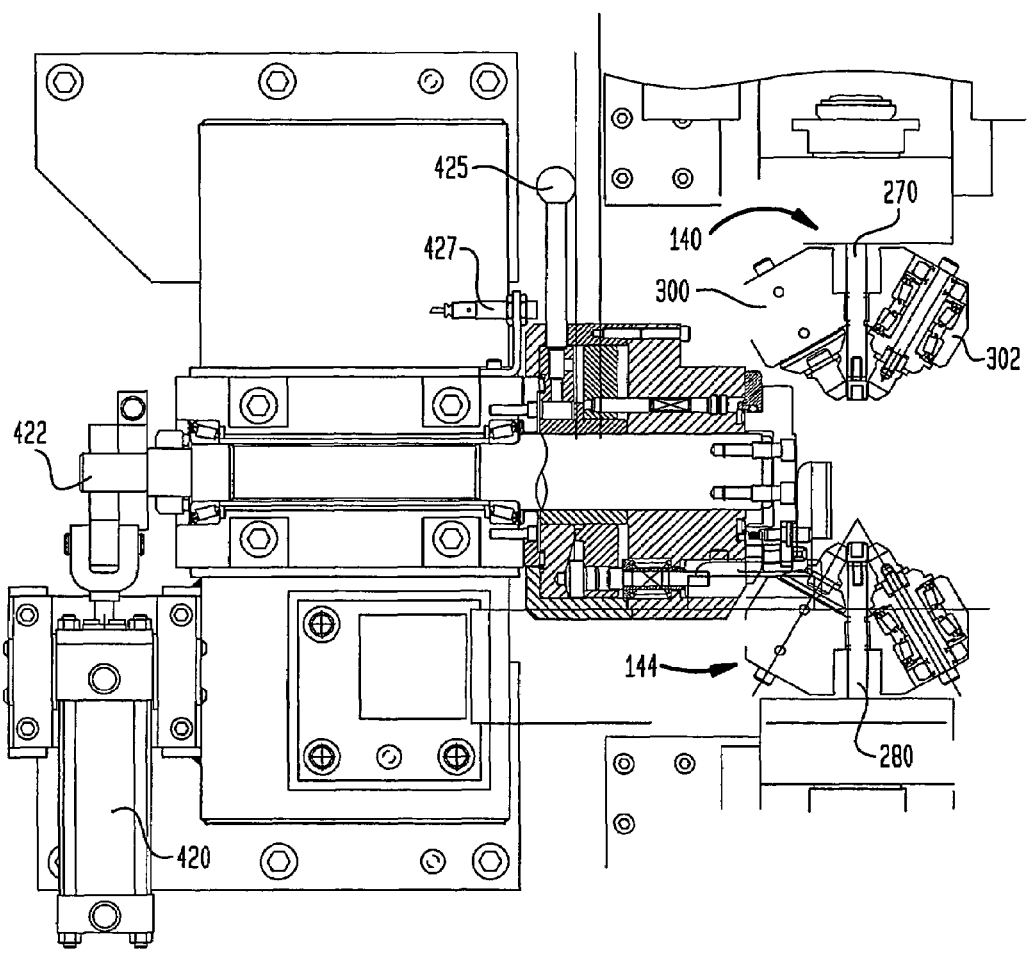
FIG. 15 is a simplified schematic side plan representation illustrating the spatial relationship between the radiative roll forming tooling, the rods that retain the spider arrangement in fixed relation, and the vehicle drive shaft clamping arrangement.

FIG. 15 is a simplified schematic side plan representation illustrating the spatial relationship between the rotary tooling, the rods that retain the spider in fixed relation, and the vehicle drive shaft clamping arrangement. Elements of structure that previously have been discussed are similarly designated. As shown in this figure, there is provided an actuator 420 that is coupled via a linkage arrangement 422 to rotate the vehicle drive shaft (not shown in this figure) by 90°. Thus, after a first set of aperture edges are roll formed as herein described, actuator 420 causes the vehicle drive shaft to be rotated, whereupon the second pair of aperture edges are oriented to be roll formed. There is additionally shown in FIG. 15 a handle 425 that actuates the flange clamp arrangement. The position of handle 425 is monitored by a sensor 427.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention and should not be construed to limit the scope thereof.

What is claimed is:

1. A method for assembling a vehicle drive shaft, the method comprising the steps of:
   defining a datum on a yoke;
   defining a datum on a drive shaft tube;
   supporting the yoke and the drive shaft tube in a spatial relationship with respect to one another responsive to the respective datums;
   first installing the yoke having an axis of rotation on a first end of the drive shaft tube coaxially with a longitudinal axis of the drive shaft tube, the yoke having first and second bores therethrough for receiving respective distal ends of a spider;
   supporting the spider in a position corresponding to the true rotating center of the drive shaft tube; and
   rolling an outer edge of the first bore to urge a portion of the material of the yoke to overlie radially the respectively associated distal end of the spider.

2. The method of claim 1, wherein said step of rolling is performed using a carbide roller arrangement.

3. The method of claim 1, wherein the steps of defining a datum includes defining a datum that corresponds to a machined surface of the yoke.

4. The method of claim 3, wherein the step of defining a datum that corresponds to a machined surface of the yoke further includes defining a datum that corresponds to a substantially cylindrical surface parallel to the axis of rotation of the yoke.

5. The method of claim 1, wherein the step of defining the datum on the drive shaft tube includes the steps of defining a datum that corresponds to a cylindrical outer surface of the drive shaft tube.

6. The method of claim 1, wherein said step of supporting the yoke and the drive shaft tube comprises the further step of clamping the drive shaft tube.

7. The method of claim 6, wherein said step of clamping the drive shaft tube comprises the further step of urging the drive shaft tube to a condition of increased cross-sectional roundness.

8. The method of claim 1, wherein the spatial relationship is coaxial within 0.006 inches.

9. The method of claim 8, wherein the spatial relationship is coaxial within 0.004 inches.

10. The method of claim 1, wherein prior to performing said step of rolling the outer edge of the first bore there is provided the further step of second installing a fastening ring in the first bore radially overlying the respectively associated distal end of the spider, and said step of rolling the outer edge of the first bore urges the portion of the material of the yoke to overlie the fastening ring.

11. The method of claim 10, wherein said step of rolling the outer edge of the first bore is performed during said step of supporting the spider.

12. The method of claim 11, wherein said step of supporting the spider comprises the further step of maintaining a compression force across a coaxial trunion pair of the spider.

13. The method of claim 12, wherein the compression force has a magnitude sufficient to ensure zero tolerance across the coaxial trunion pair of the spider and a corresponding pair of fastening rings upon completion of said step of rolling the outer edge of the first bore and a further step of rolling the outer edge of the second bore.

14. The method of claim 1, wherein prior to performing said step of rolling the outer edge of the first bore there is provided the further step of third installing a bearing cap in the first bore for supporting rotatively within the first bore the respectively associated distal end of the spider.

15. The method of claim 1, wherein there are provided the further steps of:
   second installing a further yoke on a second end of the drive shaft tube, the further yoke having first and second bores therethrough for receiving respective second distal ends of the spider, said second distal ends being arranged orthogonal to the respective distal ends; and
   rolling an outer edge of the first bore of the further yoke to urge a portion of the material of the further yoke to overlie radially the respectively associated second distal end of the spider.

16. The method of claim 15, wherein prior to performing said step of second installing a further yoke on a second end of the drive shaft tube there is provided the further step of defining a datum on the further yoke.

17. The method of claim 16, wherein prior to performing said step of second installing a further yoke, there is provided the further step of defining a further datum on the second end of the drive shaft tube.

18. The method of claim 1, wherein said step of supporting the spider comprises the further steps of:
first applying a first supporting force radially inward and coaxially parallel with the respectively associated distal end of the spider; and
second applying a second force supporting radially inward and coaxially parallel with the axially opposing end of the spider, said steps of first and second applying being performed simultaneously, whereby the spider is supported to maintain its axial position.

19. The method of claim 18, wherein there is further provided the step of first clamping the drive shaft tube at the first end thereof so as to be immovable with respect to the supported axial position of the spider.

20. The method of claim 19, wherein simultaneously with said step of first clamping the drive shaft tube there is performed the further step of controlling the first clamping of the drive shaft tube to clamp the drive shaft tube at a predetermined transaxial location responsive to a datum defined thereon.

21. The method of claim 19, wherein there is further provided the step of second clamping the drive shaft tube at the second end thereof.

22. The method of claim 21, wherein simultaneously with said step of second clamping the drive shaft tube there is performed the further step of controlling the second clamping of the drive shaft tube to clamp the drive shaft tube at the predetermined transaxial location.

* * * * *